Sept. 8, 1959

G. E. MATTIMOE ET AL 2,903,231

AUTOMATIC TARING DEVICE

Filed Dec. 12, 1957

INVENTORS
GEORGE E. MATTIMOE
EVERETT G. STEHN
GEORGE R. GIANNINI

BY

ATTORNEY

Sept. 8, 1959

G. E. MATTIMOE ET AL 2,903,231

AUTOMATIC TARING DEVICE

Filed Dec. 12, 1957

INVENTOR.
GEORGE E. MATTIMOE
EVERETT G. STEHN
GEORGE R. GIANNINI

BY

ATTORNEY

Sept. 8, 1959 G. E. MATTIMOE ET AL 2,903,231
AUTOMATIC TARING DEVICE
Filed Dec. 12, 1957 6 Sheets-Sheet 5

Fig. 8

INVENTOR.
GEORGE E. MATTIMOE
EVERETT G. STEHN
GEORGE R. GIANNINI
BY
ATTORNEY

Fig. 9

United States Patent Office 2,903,231
Patented Sept. 8, 1959

2,903,231

AUTOMATIC TARING DEVICE

George E. Mattimoe, Burlingame, Everett G. Stehn, Mill Valley, and George R. Giannini, Davis, Calif.

Application December 12, 1957, Serial No. 702,481

11 Claims. (Cl. 249—63)

This invention relates to an automatic taring device for a scale, and particularly to a pneumatic taring device and pneumatic control circuit used with a dial-type scale in a combination filling and weighing machine of the type employed for filling each of a series of containers with a predetermined weight of some materials. This application is a continuation-in-part of application Serial No. 532,562, filed September 6, 1955, now abandoned.

When the present invention is used, a container may be placed on the scale platform and its weight (the tare weight) registered by the scale dial or other indicator; then a button may be pressed to initiate an automatic cycle that begins by automatically compensating for the tare weight of the container so that the scale dial returns to zero. Next, the device automatically opens a valve to fill the container with the desired material until a predetermined net weight is attained and is indicated by the scale dial. Then the device automatically closes the filling valve, stopping the flow of material into the container. The automatic cycle ends by de-actuation of the tare-compensator, so that the scale dial finally indicates the gross weight of the filled container. The filled container can then be taken off the platform, an empty container put in its place, and another cycle begun.

A feature of the present invention is its safe use with inflammable and explosive materials. This safety stems from the fact that no electricity is used, the entire operation being accomplished by a pneumatic circuit and controlled solely by a series of pneumatic valves, preferably utilizing the air control valve shown in the Robert E. Brown Patent No. 2,604,906 issued July 29, 1952. The device is preferably made of non-sparking materials so that there is no danger in using it with highly inflammable and explosive liquids such as gasoline, kerosene and other petroleum products.

Thus, one object of the invention is to combine safety, accuracy, and rapidity in an automatic filling operation.

Another object of the invention is to provide a novel automatic tare beam for compensating for the weight of a container being filled. This object is achieved by securing a hollow cylinder to, or utilizing such a cylinder as, the main scale beam and providing a piston moved by pneumatic pressure to change the center of gravity of the cylinder-piston combination and therefore of the main beam. The piston, whose movement constitutes the sole change in the center of gravity, is provided with O-rings to obtain both an airtight seal and instant braking action, and stops moving instantly when the tare weight has been reached.

The invention is also characterized by the fact that the air conduits controlling the tare piston are either mounted independently of the beams or are mounted for movement with the beams, therefore their relative position does not affect the center of gravity of the tare beam. In other words, none of the connecting conduits change their position relative to the beams in a way that will change their moments relative to the beams.

Another object of the invention is to provide a tare system that can be mounted on existing scales without having to re-design the scale mechanism. The invention makes it possible to utilize the scale dial to indicate the weight of the empty container, the net weight of the filled container, and the gross weight of the filled container, all upon the same dial by the same indicator needle, though at different times.

Another object of the invention is to provide at all times an easily read, visual check of the accuracy of the filling operation.

Other objects and advantages of the invention will appear from the following description, presented in accordance with 35 U.S.C. 112.

The tare structure of Figs. 1–5

Figures 1, 5:
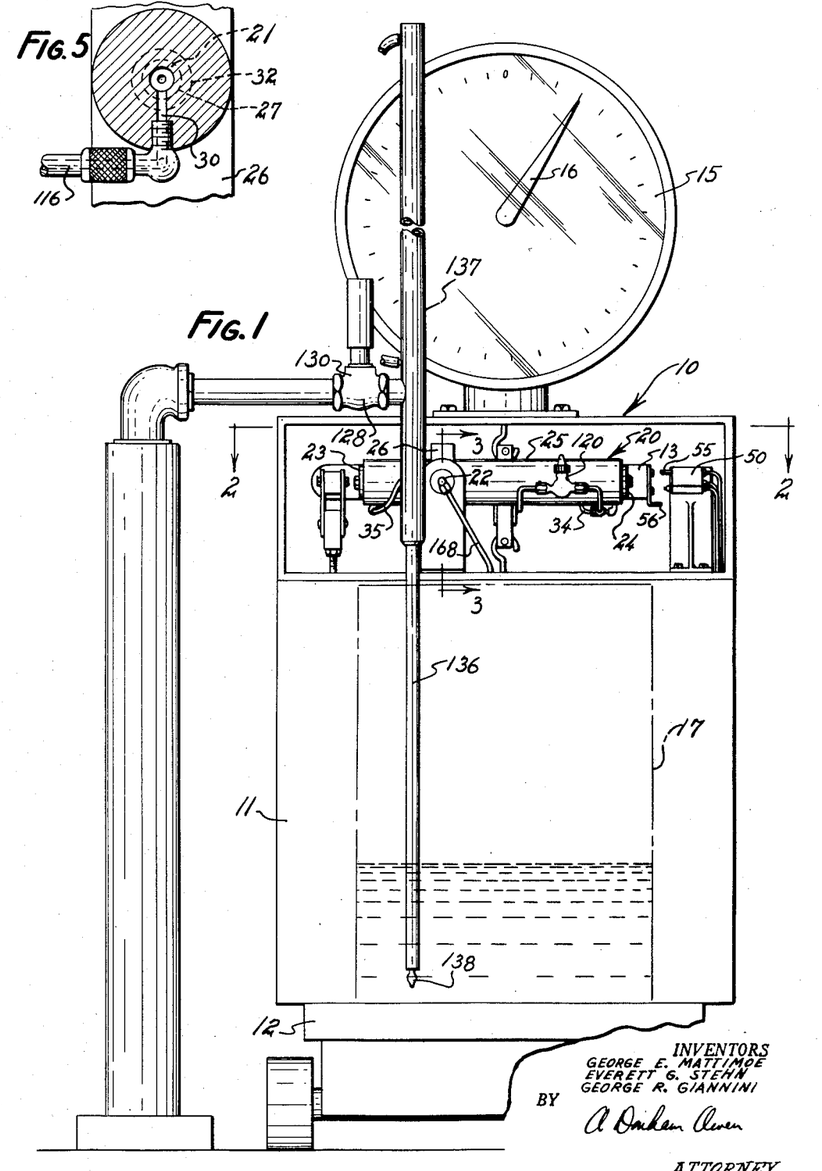
Fig. 1 is a view in front elevation of a filling and weighing machine embodying the principles of the present invention. For convenience of illustration, some portions have been broken away, a container has been illustrated in broken lines, and the tare beam has been shown in front of the main beam instead of in its more usual position behind the main beam.
Fig. 5 is a view in vertical section on the scale of Fig. 4, taken along the line 5—5 in Fig. 3.
Figure 2:
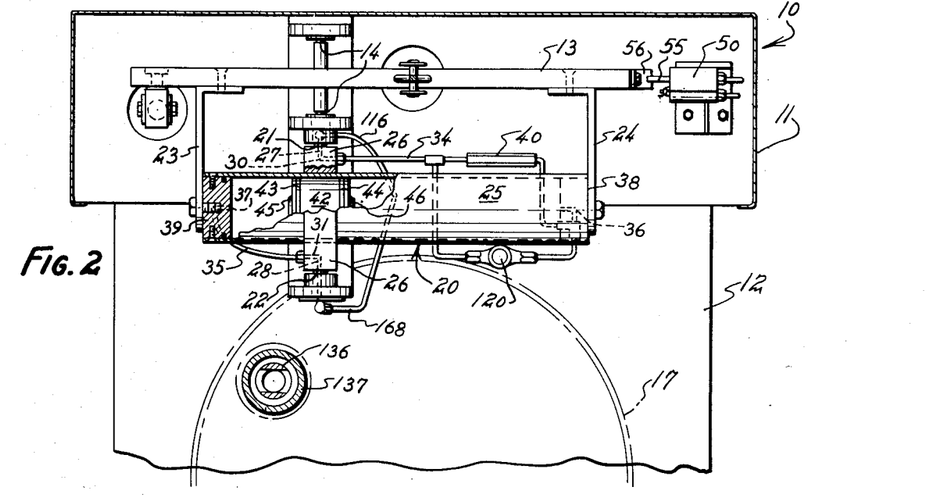
Fig. 2 is an enlarged view in horizontal section, taken along the line 2—2 of Fig. 1.

The invention will be described in connection with a scale 10 that is in most particulars conventional in structure, having a frame 11 and a weighing platform 12 connected by suitable levers (not shown because they are well known in the art) to a main scale beam 13 that is supported in the frame 11 on pivots 14. The scale 10 also may include a dial 15 with an indicator needle 16 connected to the beam 13 by suitable levers to indicate the weight of material, such as a container 17, on the platform 12. Other types of scales may also be used, such as single or multiple weigh beams, with or without dials and with or without an over-and-under balance indicator. However, the present invention does have particular applicability to dial scales, where the main beam has to swing over a relatively wide angle.

The invention may be practiced by securing a tare beam 20 to the main beam 13, parallel to it and on pivots 21 and 22 that are co-axial with the pivots 14 of the main beam 13. The attachment of the tare beam 20 to the main beam 13 may be achieved by brackets 23 and 24 extending out perpendicularly from adjacent each end of the main beam 13 and secured to the ends of the tare beam 20.

Figure 3:
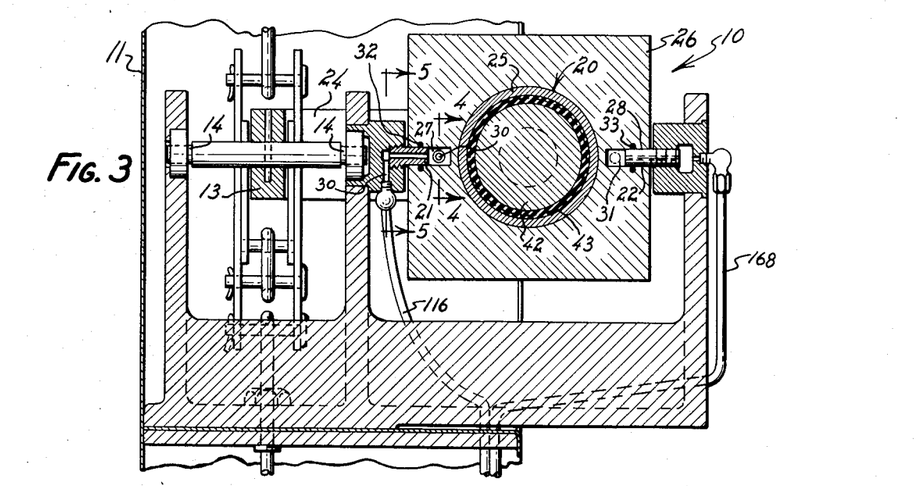
Fig. 3 is an enlarged view in vertical section, taken along the line 3—3 of Fig. 1.
Figure 4:
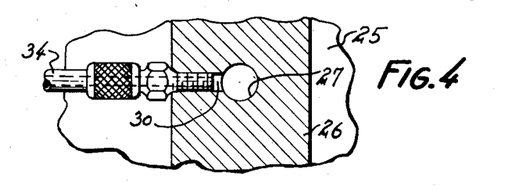
Fig. 4 is a still further enlarged view in vertical section, taken along the line 4—4 in Fig. 3.

The tare beam 20 comprises a hollow cylinder 25 mounted in and through the center of a rectangular block 26. The pivots 21 and 22 are hollow tubular members journaled into openings 27 and 28 in the rectangular block 26. The openings 27 and 28 connect with respective right-angle passages 30 and 31, so that a stream of air can be sent through either pivot 21 or 22 into its corresponding passages 30 or 31. O-rings 32, 33 located in suitable recesses in the openings 27, 28 provide an air seal around the pivots 21, 22 without interfering with their free swinging movement. The passages 30, 31 are connected to conduits 34, 35 which lead to respective inlet openings 36, 37 at the opposite closed ends 38, 39 of the hollow cylinder 25. A check valve 40 may be provided in the conduits 34 so that air beyond a predetermined pressure level can escape from the cylinder 25.

A piston 42, preferably a relatively heavy cylindrical member, is slidably mounted inside the hollow cylinder 25. The piston 42 is provided with a pair of O-rings 43, 44, one adjacent each of its faces 45 and 46 so as to provide an airtight seal with the bore of the cylinder 25. The introduction of air under pressure through an opening 36 or 37 at one end 38 or 39 of the cylinder 25, moves the piston 42 toward the opposite end 39, 38. Smooth movement and an airtight seal may be assured by providing lubricating oil on the periphery of the piston 42.

Since the air is introduced initially through the pivot points 20, 21, 27, 28 and carried by the conduits 34, 35 to the cylinder ends 38, 39 and since the conduits 34, 35 are supported entirely by the tare beam 20, there is no differential weight problem, as would be the case if the air was introduced directly into the ends 38, 39 of the tare beam cylinder 25 by independent conduits.

Mounted on the scale frame 11 adjacent the tare beam 20 is an "air switch" or air control valve 50 of the type shown in the Robert B. Brown Patent No. 2,604,906 issued July 29, 1952, and shown in somewhat simplified form in these drawings. The purpose of the valve 50 is to govern the tare-compensation of the cylinder 42—to start the cylinder moving and to stop it when the tare has been fully compensated for. The air-operated control valve 50 has a spring-urged spool 51 which can be latched in open position by air sent through a reset passage 52. When so latched, the spool 51 connects an inlet air passage 53 with an outlet air passage 54; the spool 51 separates passages 53 and 54 when the lever 55 is released mechanically by the projecting member 56 on the main beam 13. Similar air switches or control valves 57 and 58 are provided for governing the flow of material into the container 17, and these are also released by the main beam 13, preferably by an indirect engagement through a suitable rod and actuator members.

*The air circuit before initiation of the cycle*

A single air circuit operates all these switches 50, 57 and 58 and the tare piston 42 in the cylinder 25, in a manner that achieves automatic operation. When a container 17 is located on the scale platform 12, a button is pushed that starts a cycle which continues until the container 17 is filled with the correct weight. At various times in the cycle, the scale dial 15 indicates the tare weight, the net weight, and the gross weight.

The operation and structure of the air circuit will best be understood by following it in detail through a cycle, beginning with its status at the time when a drum 17 is placed on the platform 12 of the scale 10. Then the dial needle 16 of the scale 10 will point to the weight of the empty drum 17. This amount is the tare weight which is to be compensated for in the automatic operation that follows.

Air under pressure, obtained from a main air supply 60, flows through a cutoff valve 61 and a filter-regulator-lubricator 62 into a series of conduits. Considering each of these conduits in left to right order as they appear in Fig. 6, we begin with a conduit 63, which leads to a blowback pilot valve 64 to be explained more completely in due course. For the present, it is sufficient to know that the valve 64 is normally closed; so at this time the air reaches a dead end at this point. Similarly, air from the main air supply 60 also flows through a conduit 65 into a four-way pilot valve 66 at an inlet 67. The functions of this pilot valve 66 will be explained later, but it, too, leads at this time to a dead end.

Figure 6:
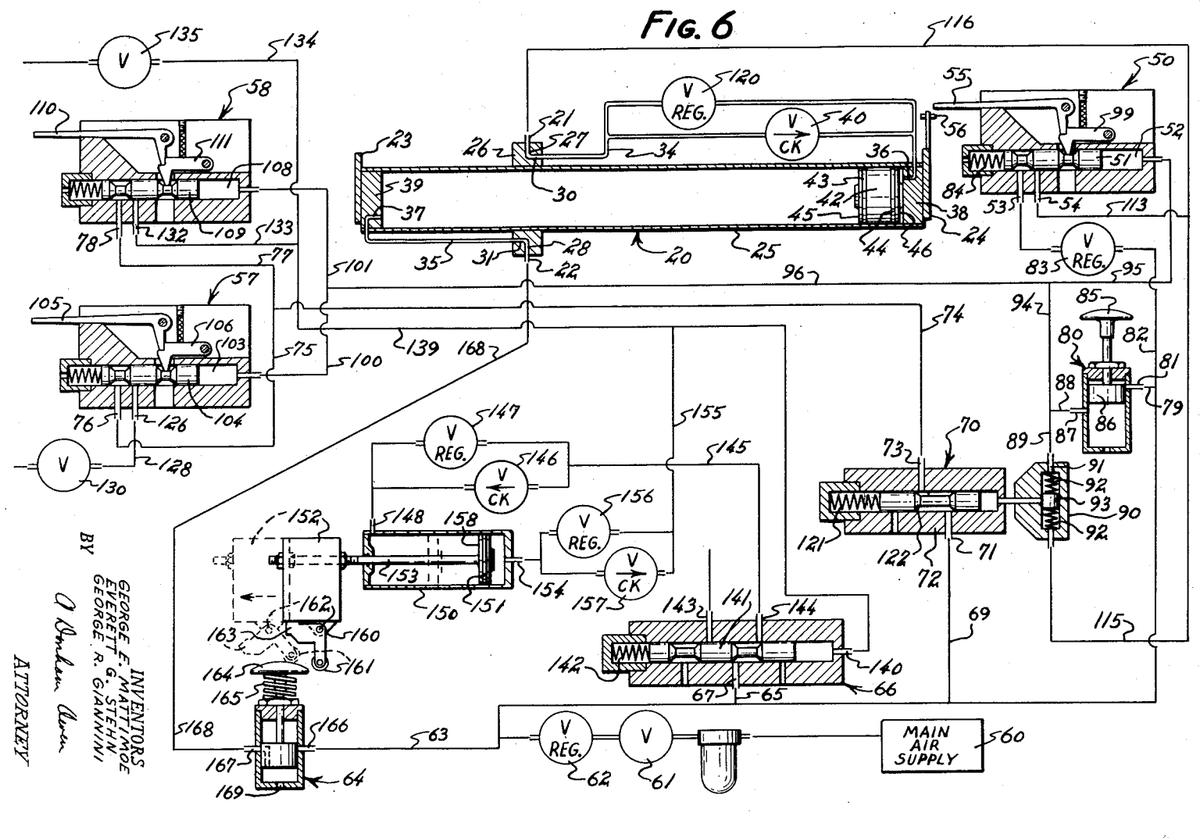
Fig. 6 is a diagram of the pneumatic circuit, including a largely diagrammatic representation of some of the valves and related parts therein.

At this time also, air from the main air supply 60 flows through a conduit 69 to another pilot valve 70, also dealt with later, where it enters an inlet 71. The valve 70 is normally open; so the air flows through a passage 72 and an outlet 73 into a conduit 74. The conduit 74 divides into two conduits, a conduit 75 conducting air to the air control valve 57 at an inlet 76, and a conduit 77 that leads to the air control valve 58 at an inlet 78. At this time the air control valves 57 and 58 are also dead ends, being closed.

Still considering the status before operation begins, the air from the main air supply 60 is also passing through a conduit 79 to a normally closed main pilot valve 80 at an inlet 81, where it reaches a dead end. Air also flows through a conduit 82 and a regulator 83 (where its pressure is reduced from about 100 pounds per square inch to about 60 p.s.i.) to the inlet passage 53 of the air control valve 50. The spool 51 of the control valve 50 is normally urged to a closed position by the spring 84; so here, too, is a dead end. Thus the main air supply 60 maintains pressure at a number of points but without accomplishing any movement of parts until a button 85 on the main pilot valve 80 is depressed.

*Initiation of a cycle: Resetting the control valves 50, 57 and 58*

Once the drum 17 is on the scale platform 12 and properly positioned, the operator commences the automatic operation by depressing the button 85 on the main pilot valve 80. He holds the button 85 depressed for a moment and then releases it. While the button 85 is held down, several things happen in a fraction of a second, each of which will now be described.

A pulse of air from the main air supply 60 passes through the inlet 81 of the valve 80 and through a passage 86 and an outlet 87 into a conduit 88. The conduit 88 leads to a conduit 89 which in turn leads to a shuttle valve 90 via an inlet 91. The shuttle valve 90 is actuated by the pulse of air to close the normally open pilot valve 70, with the result that the flow of air from the inlet 71 to the outlet 73 is cut off, and no air will pass into the inlet 76 of the air control valve 57 or into the inlet 78 of the control valve 58. Prior to this time, springs 92 have urged the pilot valve spool 93 into its normally open position, but the air pressure through the shuttle valve 90 more than offsets the pressure of the springs 92 and moves the spool 93.

Also during the fraction of a second while the button 85 is depressed, all three air control valves 50, 57 and 58 are reset by air passing from the conduit 88 into a conduit 94. The conduit 94 branches into two conduits 95 and 96. The conduit 95 leads into the reset passage 52 of the normally-closed air-control valve 50 and moves the spool 51 to its open position, retracting the lever 55 and setting a latch 99 to hold the spool 51 in its open position.

Simultaneously, the pulse of air passes through the conduit 96 to conduits 100 and 101. The conduit 100 leads into the reset passage 103 of the valve 57, moving its spool 104 to the open position, setting its lever 105 and its latch 106 to hold the spool 104 in its open position. At the same time, air from the conduit 101 passes into the reset passage 108 of the air control valve 58, moving its spool 109 to open position and setting its lever 110 and its latch 111, so that the spool 109 is held in open position. However, during this time no air is entering the inlets 76 and 78; so nothing happens at this time in the control valves 57 and 58 except the resetting and latching open of the valves.

*The automatic taring operation*

Returning now to the tare air-control valve 50, as soon as it is re-latched, air that has come from the regulator 83 into the inlet passage 53 flows through the outlet passage 54 into a conduit 113. The conduit 113 leads into two conduits 115 and 116. Air flows through the conduit 115 to the shuttle valve 90 and acts to keep it open and keep the pilot valve 70 closed. For that reason, the button 85 need be held down only long enough to reset the control valves 50, 57 and 58 and put air pressure into the conduit 115; then it can be released. This takes less than a second.

The conduit 116 conducts air at 60 pounds pressure through the pivot 21, the passage 27, and conduit 34 to the check valve 40 and a needle valve 120, where the exact desired air pressure for proper movement of the tare piston 42 is obtained. The regulated air passes into the tare cylinder 25, via the inlet 36. The air pressure then moves the piston 42 to the left, causing the center of gravity of the tare beam 20 to shift, until finally the piston 42 reaches a point where the tare beam 20 acts on the main beam 13 to balance the weight of the drum 17 on the scale platform 12. When the piston 42 reaches this position, the scale beam 13 and the tare beam 20 will pivot, and the projection 56 on the main beam 13 will engage the lever 55, releasing the latch 99, so that the spring-urged spool 51 closes the air control valve 50 and cuts off the inlet passage 53 from the outlet passage 54. This completes the balancing of the container 17 by the tare beam 20, and the dial indicator 17 once again reads at zero.

*The automatic filling operation*

The filling operation now commences immediately and automatically. When the valve 50 is closed, air no longer passes through the conduit 115 into the shuttle valve 90, so a spring 121 forces a spool 122 to the right. Air will now flow from the inlet 71 to the outlet 73 of the pilot valve 70 and from there through the conduits 74, 75 and 77 into the inlets 76 and 78 of the air control valves 57 and 58. The air entering the valve 57 now passes from the inlet passage 76 through an outlet passage 126 into a conduit 128 which controls the main flow control valve 130. At the same time, air from the inlet passage 78 of the valve 58 flows through an outlet passage 132 and conduits 133 and 134 into dribble flow control valve 135. Material will therefore flow into the container 17.

As shown in Fig. 1, the device is often used in a liquid-filling device of the lance type, like that described in Patent No. 2,750,091 to George E. Mattimoe and Everett G. Stehn, issued June 12, 1956. In such a device, the main valve 130 first actuates the lance 136, projecting it down from its stationary housing 137 into the container 17. When the lance 136 is fully projected, its valve 137 opens automatically as described in the patent just referred to, and liquid begins to flow into the container 17. The liquid will flow at a fast rate until a lever connected to the scale beam 13 engages the lever 105 and closes the valve 57, shutting off the valve 130. Flow will then continue at a slow rate, as controlled by the valve 135, until a second lever connected to the scale beam 13 trips the lever 110. Then, if a lance-type filler is being used, the lance 136 will automatically be retracted into its housing 137, clearing the top of the container 17.

*Resetting the tare piston 42*

As long as air flows through the air switch 57, air passes through conduits 133 and 139 to an inlet 140 of the normally closed four-way pilot valve 66. This action moves the spool 141 against the pressure of a spring 142 and permits air to pass from the inlet 67 to an outlet 143 and closes off an outlet 144 through which the air passed heretofore via a conduit 145 through a parallel ball check valve 146 and needle valve 147 into the inlet 148 of a cylinder 150. This pressure through the inlet 148 had heretofore kept a piston 151 at the right end of the cylinder 150, holding a fly-by 152 in the position shown in solid lines in Fig. 6, the fly-by 152 being connected to the piston 151 by a rod 153. Now, however, this air is closed off. Consequently, the piston 151 is acted on by air entering the cylinder 150 through inlet 154, via the conduit 139, branch conduit 155, and the combination ball-check valve 156 and needle valve 157. The latter valve 157 keeps the air pressure at the inlet 154 lower than that through the inlet 148.

This causes the piston 151 with its O-ring seal 158 to move to the left carrying the fly-by 152 with it. A cam 160 with its roller 161 is mounted pivotally on a pin 162, with an arm 163 extending perpendicularly to the left. Movement to the left causes the roller 161 to engage a button 164 of the normally closed pilot valve 64, but the pressure of a spring 165 holds the button 164 up, and the cam 160 swings freely around its pivot (as shown in dotted lines in Fig. 6); so the valve 64 is undisturbed by this movement, which is merely a preparatory movement.

Then when the lever 110 is tripped, cutting off the air passage through the conduit 139, air no longer enters the cylinder inlet 154 or the inlet 140 of the four-way pilot valve 66. Therefore, the spring 142 forces the spool 141 to the right, and the main air from the conduit 65 enters the inlet 67, goes out the outlet 144, through the conduit 145, through the needle valve 147, and into the cylinder 150 at the inlet 148. This forces the piston 151 to the right, carrying the fly-by 152 with it.

When the fly-by 152 moves to the right, the roller 161 again engages the button 164, but this time the arm 163 engages the bottom of the fly-by 152 and prevents the cam 160 from swinging on its pivot 162. Consequently, the cam 160 depresses the button 164 against the pressure of its spring 165 as it passes over it. This sends a momentary pulse of air from the conduit 63 through an inlet 166 and an outlet 167 into a conduit 168. The conduit 168 is connected to the hollow pivot 22 of the tare beam 20. This sends air through the passage 31 and conduit 35 into the opening 37 of the cylinder 25. The pressure being greater than that remaining in the other side of the cylinder 25 immediately moves the piston 42 to the right, all the way to the opposite end 38, air meanwhile bleeding off from the conduit 34 through the check valve 40. The dial needle 16 then gives the gross weight of the filled container and concludes the cycle. As soon as the fly-by 152 has passed over the button 164, the pulse of air through the conduit 168 stops and the pressure bleeds off through the discharge opening 169 in the bottom of the valve 64.

*Summary of operation*

When the scale platform 12 is empty, the indicator 16 points to zero. When the container 17 is placed on the scale platform 12 and positioned relative to the filling valves, the needle 16 points to the empty weight of the container 17.

Now the button 85 on the main pilot valve 80, is pushed, and a pulse of air resets the three control valves 50, 57 and 58. Immediately, air passes through the tare control valve 50 into the tare cylinder 25 and moves the piston 42 to the left as seen in Fig. 6 until its change of position balances the tare weight of the container 17. Then the bracket 56 on the main beam 13 engages the lever 55, releasing the latch 99 and closing the control valve 50. The piston 42 will therefore remain in this position, and the indicator needle 16 of the scale will again point to zero.

As soon as the tare control valve 50 is closed, the pilot valve 70 is automatically opened, and air flows through the control valves 57 and 58, sending liquid into the container 17. Shortly before the container is filled, the scale beam 13 (through a lever system, if desired) engages the lever 105 of the control valve 57 releasing the latch 106 and closing the valve 57. This reduces the flow to a slow or dribble rate. When the container 17 is filled to the exact net weight desired, the scale indicator 16 points to the net weight of the filled container 17. At this instant, a lever atached to the scale beam 13 engages the lever 110, releasing the latch 111 and closing the control valve 58, cutting off entirely the flow of liquid into the container 17, and completing the filling operation.

When the pilot valve 70 was opened, and air flowed into the control valves 57 and 58, air also operated to move the piston 151 and the fly-by 152 to the left across the pilot valve 64, the cam 160 swinging out of position so that it did not depress the button 164 of the valve 64. As soon as both air control valves 57 and 58 are closed, air flows through the pilot valve 66 into the conduit 145 and into the left end of the cylinder 150, moving the piston 151 and the fly-by 152 to the right. The cam 160 momentarily depresses the pilot valve button 164, and a pulse of air then flows from the conduit 63 through the pilot valve 64 and conduit 168 into the left hand end of the tare cylinder 25, moving the tare piston 42 all the way to the right, against the closed end 38 of the cylinder 25. This means that the entire operation has been completed, and the scale indicator 16 now points to the gross weight of the filled container 17.

The container can now be removed and a new one located properly on the platform 12, and the entire cycle repeated.

It will be appreciated that no electricity is used in this automatic operation. Therefore, when the moving parts are made for non-sparking materials, such as brass, the entire operation is safe for use even with highly inflammable or explosive liquids, and achieves the object of providing safe operation in automatic filling devices.

Also, it will be appreciated that the device is extremely rapid and fully accurate and that it makes it possible to meter the exact net weight of material with which the container 17 is to be filled, while also giving a visual check of both the tare weight of the container 17 and the gross weight of the filled container 17, which will be necessary in calculating freight weight.

It will also be seen how the invention is easily combined with existing scale equipment and can use standard weighing mechanisms, to which tare beam 20 has been added.

Figure 7:
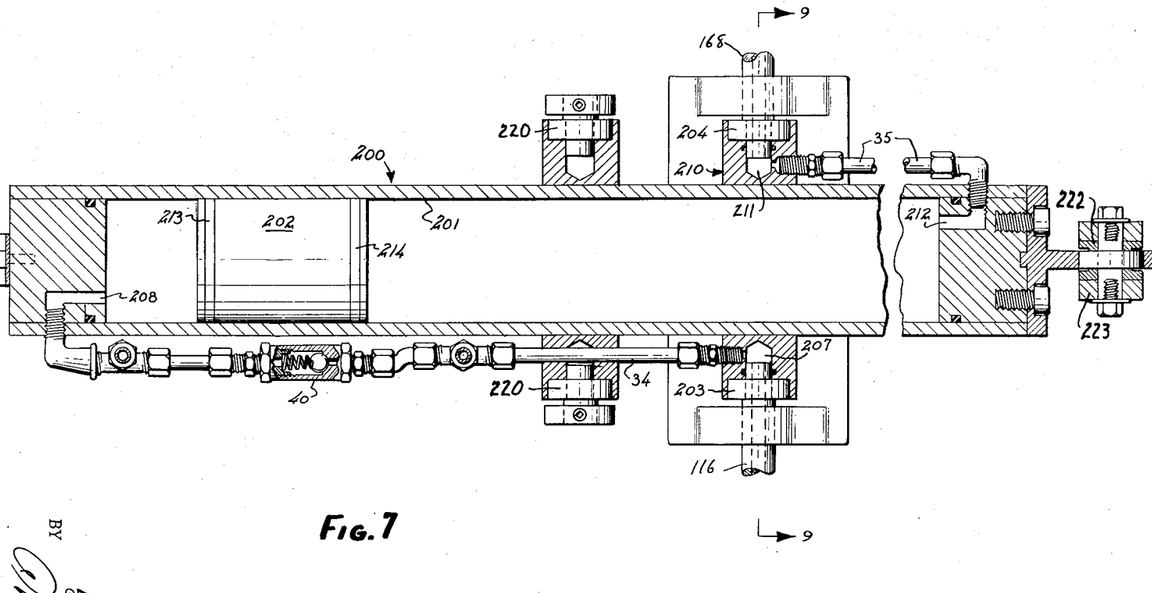
Fig. 7 is a view in horizontal section of a modified form of scale beam taken along the line 7—7 in Fig. 8.
Figure 8:
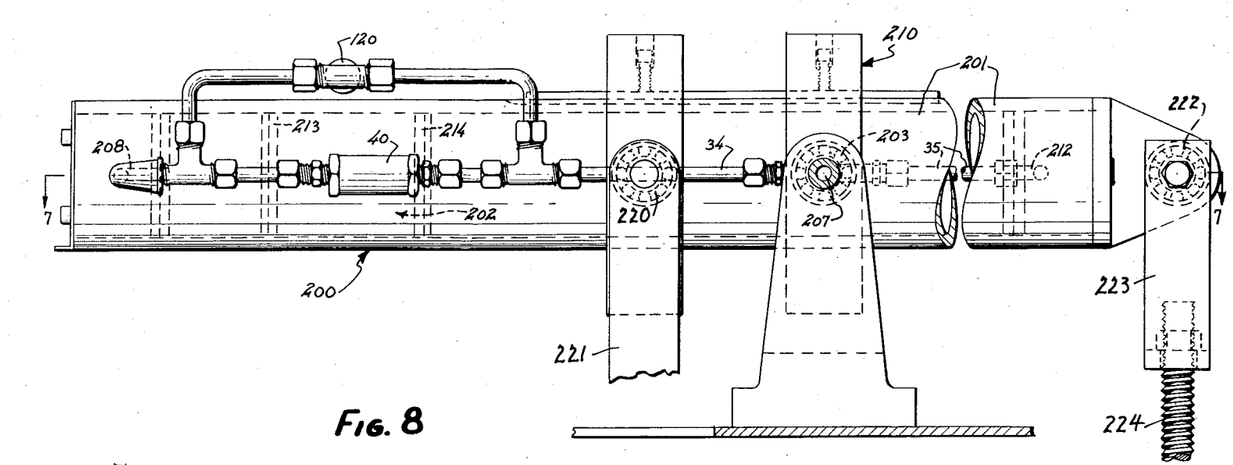
Fig. 8 is a view in side elevation of the beam of Fig. 7.
Figure 9:
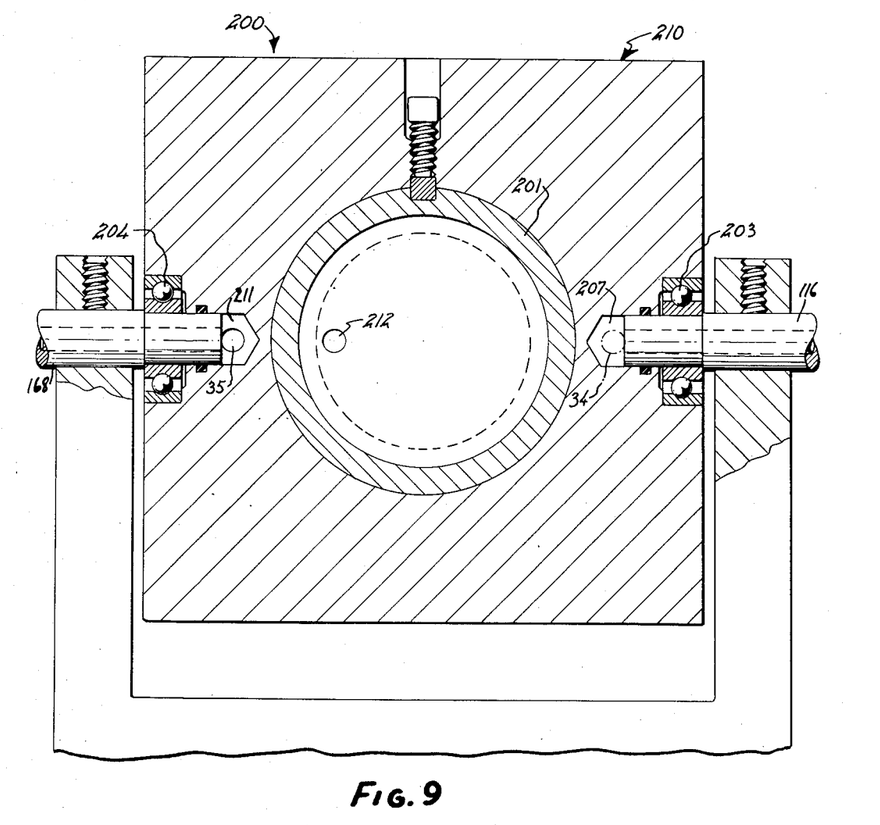
Fig. 9 is a view in vertical cross section taken along the line 9—9 in Fig. 7.

The tare structure of Figs. 7–9

A modified form of the invention is shown in Figs. 7–9. In the form previously described a separate tare beam 20 was added to an already-existing main beam 13, but since the tare beam 20 was supported directly by the main beam 13, they are actually acting as a unit pivoted at one location. In the form now to be described, the unity of the structure is even more apparent. Here the main beam 200 is cylindrical and is hollow to provide a pneumatic cyclinder 201 in which an air-tare free-piston 202 moves, in just the way in which the piston 42 moves in the cylinder 25. Its main pivots may comprise a pair of ball bearings 203 and 204 engaging stationary pivots 205 and 206 that are supported by the scale frame.

As before, the air conduits 116 and 168 lead in along the main pivot line; in this instance into the pivots 205 and 206. From there, a conduit 207 leads from the conduit 116 to the conduit 34 which moves with the cylindrical beam 200, along with its check valve 40 and regulator valve 120. Air is therefore conducted into a fitting 208 at one end of the cylinder 200. The same block member 210 which contains the conduit 207 also includes a conduit 211 which connects the conduit 168 to the conduit 35 leading to a fitting 212 at the other end of the cylinder 201.

As before, the free piston 202 has O-rings 213 and 214 that prevent air passage and assure absolute reproducibility of resutls.

Libe the main beam 13, the cylindrical beam 200 has ball-bearing connections 220 to a draft rod 221 and similar connections 222 to a switch rod hanger 223 that supports a switch rod 224 that actuates the switch lever 105 and 110 as before.

Operation is unchanged, and which form of the invention is chosen depends on the apparent respective advantages. The previous form may be installed on a scale, right on an existing beam. The present form required replacements of the main beam but is more compact.

The check valve 40 enable rapid escape of air in the exhaust or blow-back cycle. Also, the needle valve 120 meters the air coming in, thereby controlling the speed of the piston 42, just as in the earlier-described modification. Also, in both forms of the invention, if the regulator 83 is closed, so that its dial reads zero, the machine in either form becomes a gross filler; the entire tare cycle is then eliminated and each drum is then filled to the same gross weight. This flexibility of use is important for producers who ship outside the country to places where constant gross weights are demanded.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A taring device for a scale, including in combination a frame having stationary pivots; a weighing beam supported on said pivots and comprising a pneumatic cylinder, a free piston slidable in said cylinder, air inlet means adjacent each end of said cylinder for introducing air on either side on said piston to move it in said cylinder and thereby to change the moment of said free piston about said pivots, and respective conduits supported by said beam and leading from each said air inlet means to respective points in line with said pivots; and respective air passage means supported by said frame and connected to said conduits in line with said pivots for sending air into either said conduit, said conduits acting as part of said beam and introducing no variable when said beam swings.

2. The device of claim 1 wherein said beam comprises a hollow member, the hollow portion being said cylinder and the conduits leading directly to said pivots.

3. The device of claim 1 wherein said beam comprises a main beam and a tare beam directly supported by said main beam parallel thereto, said tare beam including said cylinder.

4. A taring device for a dial scale and the like, including in combination a frame including stationary pivots; a weighing beam supported on said pivots and comprising a pneumatic cylinder, a free piston slidable in said cylinder, and with a pair of O-rings, one adjacent each of its ends, to seal the air in said cylinder against passage of air therearound, air inlet means adjacent each end of said cylinder for introducing air on either side on said piston to move it in said cylinder and thereby to change the moment of said free piston about said pivots, and respective conduits supported by said beam and leading from each said air inlet means axially along the exterior of said cylinder to respective points in line with said pivots; and respective air passage means supported by said frame and connected to said conduits in line with said pivots for sending air into either said conduit, said conduits acting as part of said beam and introducng no variable when said beam swings.

5. A taring device for a dial scale and the like including in combination a frame including stationary pivots; a cylindrical hollow weighing beam supported on said pivots and comprising a pneumatic cylinder, a free piston slidable in said cylinder, air inlet means adjacent each end of said cylinder for introducing air on either side on said piston to move it in said cylinder and thereby to change the moment of said free piston about said pivots, and respective axial conduits supported on the exterior of said beam and leading from each said air inlet means to said pivots; and respective air passage means supported by said frame and connected to said conduits at said pivots for sending air into either said conduit, said conduits acting as part of said beam and introducing no variable when said beam swings.

6. A taring device for a scale having a pivotally supported main weighing beam, including in combination a main beam pivot, a pneumatic cylinder supported by and parallel to said main beam, a free piston slidable in said cylinder, air inlet means adjacent each end of said cylinder, block means on said cylinder generally co-axial with the pivot for said main beam and having a pair of passages, one in each side, co-axial with said main beam pivot, to each of said pair of passages and in communication therewith, conduit means leading from each said passage to one of said inlet means; stationary conduit means extending into each said passage along said pivot axis; and an O-ring bearing in each passage sealing said stationary conduit means.

7. In an automatic taring, filling and weighing device having a scale and a filling valve, the combination therewith of: a pivotally supported main scale beam; air-pressure actuable tare means supported by said main beam; a main supply of air under pressure; a first air control valve means for actuating said tare means in one direction and connected to said main air supply, having an air-actuated activating means and a beam-actuated deactivating means; second air control valve means connected to said main air supply for opening said filling valve and shutting it off; a first, normally open, pilot valve connected between said main air supply and the inlet for said material-flow air control valve; means for sequentially sending air into said tare means through said first valve means until the tare exerted on said scale beam is counterbalanced, then opening said filling valve through said second valve means until the desired amount of material has been dispensed, then closing said filling valve, and then actuating said tare means in the opposite direction to decounterbalance said tare.

8. In an automatic filling and weighing device having a scale and a filling valve, the combination therewith of: a pivotally supported main scale beam; a tare beam supported by said main beam and comprising a pneumatic cylinder with a movable piston therein and first and second air inlet means at each end of the cylinder for the introduction of air under pressure for moving the piston in either direction; a main supply of air under pressure; a tare air control valve having an inlet passage connected to said main air supply, an outlet passage connected to said first air inlet means, valve means normally separating and adapted to connect said inlet and outlet passages, air re-set means for moving said valve means into its passage-connecting position, mechanical latching means for maintaining said valve means in its passage-connecting position, and a release lever mounted adjacent the scale beam and adapted to be mechanically contacted when the beam swings into a predetermined position for releasing said latching means; a material-flow air control valve having the same elements as said tare air control valve, having an inlet and an outlet connected to said filling valve for opening it; a first, normally open, pilot valve connected between said main air supply and the inlet for said material-flow air control valve; a second, normally closed, pilot valve having an outlet, and having an inlet connected to said main air supply and having manually actuable opening means; conduit means connecting said second pilot valve outlet to the air re-set means for both said tare air control valve and said material-flow air control valve; control means connected to said second pilot valve outlet and to the outlet from said tare air control valve and actuated by air from either for urging said first pilot valve to a closed position; whereby upon actuation of said second pilot valve air under pressure moves said piston in said tare beam until the center of gravity of the main beam shifts sufficiently to actuate the latch release lever on said tare air control valve, whereupon said first pilot valve control means is de-actuated and said first pilot valve re-opens, sending air through said material-flow air control valve to fill a container on said device with a predetermined amount of material until the swinging of said main beam actuates the lever for said material-flow air control valve and closes said filling valve; a third normally closed pilot valve having its inlet connected to said main air supply and its outlet connected to said second air inlet means on said tare cylinder; and means actuated upon the closure of said material-flow air control valve for briefly opening said tare piston re-set pilot valve to send a pulse of air therethrough into said tare cylinder for moving said tare piston to the opposite end of said cylinder.

9. In an automatic container-taring, filling and weighing device having a scale and a filling valve, the combination therewith of: a pivotally supported main scale beam; a tare beam supported by said main beam and comprising a pneumatic cylinder with a movable piston therein and first and second air inlet means at each end of the cylinder for the introduction of air under pressure for moving the piston in either direction; a main supply of air under pressure; a tare air control valve having an inlet passage connected to said main air supply, an outlet passage connected to said first air inlet means, air re-set and mechanically latched and mechanically released valve means normally separating and adapted to connect said inlet and outlet passages; a filling-valve air control valve having the same elements as said tare air control valve, its inlet also being connected to said main air supply, and its outlet being connected to said filling valve for opening it; a normally closed, pilot valve having an outlet connected to air-re-set said tare air control valve and said filling valve air control valve and having an inlet connected to said main air supply and having manually actuable opening means; control means connected to both said pilot valve outlet and said tare air control valve outlet and actuated by air from either for separating said filling valve air control valve from said main air supply, whereby upon actuation of said pilot valve air under pressure moves said piston in said tare beam until the center of gravity of the main beam shifts sufficiently to actuate the mechanical release for said tare air control valve, whereupon said control means is de-actuated and air passes through said filling valve air control valve to fill a said container with a predetermined amount of material until the swinging of said main beam actuates the mechanical release for said filling valve air control valve and closes said filling valve; and means connected to said main air supply and actuated upon the closure of said filling valve air control valve for sending a pulse of air into said tare cylinder second inlet means for moving said tare piston to the opposite end of said cylinder.

10. The device of claim 9 in which said last-named means includes a mechanically actuated valve, normally urged by spring pressure to a closed position, an air cylinder with a piston that is moved in one direction when air flows through said filling valve air control valve and is moved in the opposite direction when air ceases flowing through said filling valve air control valve, and a pivoted member connected to said piston for actuating said mechanically actuated valve in one direction only and swinging out of the way in its other direction.

11. In an automatic container taring, filling, and weighing device having a scale and a filling valve, the combination therewith of: a pivotally supported main scale beam; a pneumatically controlled tare beam supported by said main beam and having first and second air inlet means at each end for the introduction of air under pressure for changing the tare; a main supply of air under pressure; a first air control valve having an inlet passage connected to said main air supply, an outlet passage connected to said first air inlet means, valve means normally separating and adapted to connect said inlet and outlet passages, air re-set means for said valve means, and mechanical latching and release means for said valve means, adapted for actuation by said beam; a second valve having the same elements as said first air control valve, its inlet also being connected to said main air supply, and its outlet being connected to said filling valve; a normally closed, pilot valve having an inlet connected to said main air supply, manually actuable opening means; and an outlet connected to the air re-set means for both said first and second air control valves; flow control means connected to both said pilot valve outlet and said first air control valve outlet and actuated by air from either for shutting off said second valve from said air supply; whereby upon actuation of said pilot valve air under pressure moves into said tare beam first air inlet means until the center of gravity of the main beam shifts sufficiently to actuate the latch release on said first air control valve, whereupon said flow control means is de-actuated, sending air through said second air control valve, said filling valve then serving to fill a container with a predetermined weight of material, the swinging of said main beam actuating the latch release for said second air control valve and closing said filling valve; and means connected to said main air supply and actuated upon the closure of said second air control valve for sending a pulse of air into said second air inlet means for restoring said tare beam to its neutral position.

References Cited in the file of this patent

UNITED STATES PATENTS

| | | |
|---|---|---|
| 2,073,445 | De Iongh | Mar. 9, 1937 |
| 2,264,562 | Bryant et al. | Dec. 2, 1941 |
| 2,489,776 | Hooper | Nov. 29, 1949 |
| 2,545,118 | St. Clair | Mar. 13, 1951 |
| 2,645,447 | Clark et al. | July 14, 1953 |
| 2,751,181 | Baldwin et al. | June 19, 1956 |

FOREIGN PATENTS

| | | |
|---|---|---|
| 343,425 | Great Britain | Feb. 9, 1931 |